US012682056B2

(12) United States Patent
Beckett et al.

(10) Patent No.: US 12,682,056 B2
(45) Date of Patent: Jul. 14, 2026

(54) TECHNIQUES FOR DETECTING ANOMALIES IN DATA FILES

(71) Applicant: Microsoft Technology Licensing, LLC, Redmond, WA (US)

(72) Inventors: Ryan A. Beckett, Redmond, WA (US); Siva Kesava Reddy Kakarla, Redmond, WA (US); Yu Yan, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 70 days.

(21) Appl. No.: 18/651,282

(22) Filed: Apr. 30, 2024

(65) Prior Publication Data

US 2025/0335588 A1     Oct. 30, 2025

(51) Int. Cl.
*G06F 21/56*         (2013.01)
*G06N 5/025*        (2023.01)
*G06N 20/00*        (2019.01)

(52) U.S. Cl.
CPC ........... *G06F 21/565* (2013.01); *G06N 5/025* (2013.01); *G06N 20/00* (2019.01)

(58) Field of Classification Search
CPC ....... G06F 21/565; G06N 5/025; G06N 20/00
See application file for complete search history.

(56) References Cited

U.S. PATENT DOCUMENTS

| | | | | | |
|---|---|---|---|---|---|
| 10,839,352 | B1 * | 11/2020 | Mitchell | ............ | G06Q 10/1057 |
| 2017/0068714 | A1 * | 3/2017 | Selfridge | .............. | G06F 16/284 |
| 2020/0327444 | A1 * | 10/2020 | Negi | ...................... | G06F 21/602 |
| 2021/0241043 | A1 * | 8/2021 | Morin | ....................... | G06N 3/08 |
| 2022/0129551 | A1 * | 4/2022 | Collier | .................. | G06F 21/565 |
| 2022/0382784 | A1 * | 12/2022 | Osuala | .................. | G06F 16/285 |
| 2022/0405572 | A1 * | 12/2022 | Oliinyk | ................... | G06N 5/04 |
| 2023/0096474 | A1 * | 3/2023 | Krishnan | ............. | G06N 3/0464 726/26 |
| 2024/0330365 | A1 * | 10/2024 | Zawadowskiy | ..... | H04L 63/1425 |
| 2025/0124153 | A1 * | 4/2025 | Schaffer | ................. | G06F 9/451 |

FOREIGN PATENT DOCUMENTS

| | | | | | |
|---|---|---|---|---|---|
| CN | 117389643 A | * | 1/2024 | .......... | G06F 9/4451 |

OTHER PUBLICATIONS

M. K. Yusof et al. Efficiency of Flat File Database Approach in Data Storage and Data Extraction for Big Data. Indonesian Journal of Electrical Engineering and Computer Science, vol. 9, No. 2. Pages 460-473. Feb. 2018. (Year: 2018).*
"Association rule learning", Retrieved From: https://en.wikipedia.org/wiki/Association_rule_learning, accessed on Apr. 24, 2024, 17 Pages.

* cited by examiner

*Primary Examiner* — Robert B Leung
(74) *Attorney, Agent, or Firm* — ArentFox Schiff LLP

(57) ABSTRACT

Described are examples for detecting anomalies in files. Each of multiple files can be processed to generate corresponding flat files. Values can be extracted from multiple lines of each of the flat files into a parameter vector. Patterns can be generated from the multiple lines based on the values extracted. The parameter vector and the patterns can be provided as input to a machine learning (ML) model to obtain a set of rules for the files based on conditional probabilities. The set of rules can be applied to a set of one or more files to detect anomalies in values in the set of one or more files.

18 Claims, 9 Drawing Sheets

Figure 2:
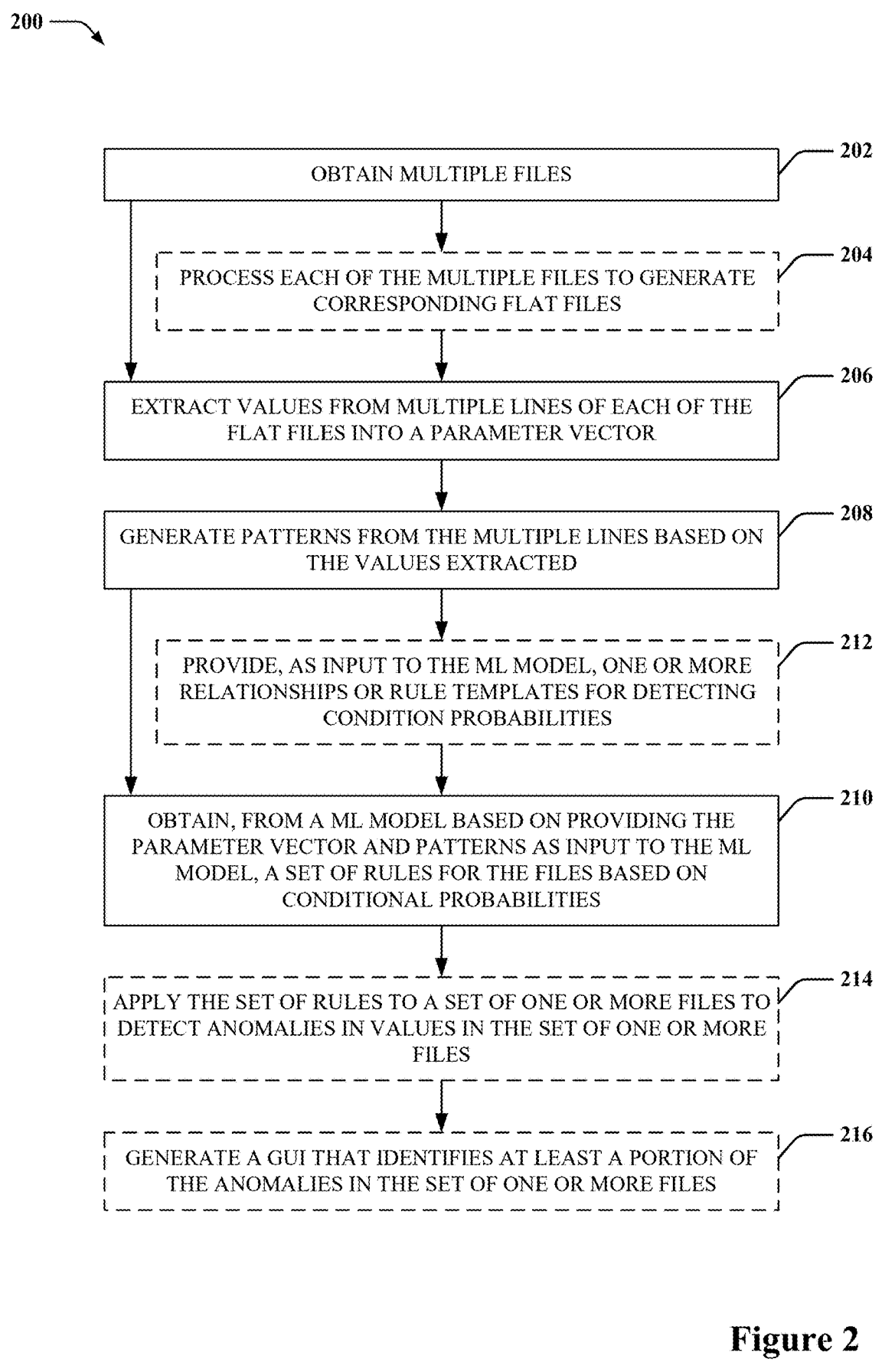

200 —

```
┌─────────────────────────────────────────────────────────┐
│              OBTAIN MULTIPLE FILES                       │ ── 202
└─────────────────────────────────────────────────────────┘
                           │
                           ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│   PROCESS EACH OF THE MULTIPLE FILES TO GENERATE        │ ── 204
│              CORRESPONDING FLAT FILES                    │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                           │
                           ▼
┌─────────────────────────────────────────────────────────┐
│   EXTRACT VALUES FROM MULTIPLE LINES OF EACH OF THE      │ ── 206
│        FLAT FILES INTO A PARAMETER VECTOR                │
└─────────────────────────────────────────────────────────┘
                           │
                           ▼
┌─────────────────────────────────────────────────────────┐
│   GENERATE PATTERNS FROM THE MULTIPLE LINES BASED ON     │ ── 208
│              THE VALUES EXTRACTED                        │
└─────────────────────────────────────────────────────────┘
                           │
                           ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│   PROVIDE, AS INPUT TO THE ML MODEL, ONE OR MORE        │ ── 212
│   RELATIONSHIPS OR RULE TEMPLATES FOR DETECTING         │
│              CONDITION PROBABILITIES                     │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                           │
                           ▼
┌─────────────────────────────────────────────────────────┐
│   OBTAIN, FROM A ML MODEL BASED ON PROVIDING THE        │ ── 210
│   PARAMETER VECTOR AND PATTERNS AS INPUT TO THE ML      │
│   MODEL, A SET OF RULES FOR THE FILES BASED ON          │
│              CONDITIONAL PROBABILITIES                   │
└─────────────────────────────────────────────────────────┘
                           │
                           ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│   APPLY THE SET OF RULES TO A SET OF ONE OR MORE FILES TO│ ── 214
│   DETECT ANOMALIES IN VALUES IN THE SET OF ONE OR MORE   │
│                       FILES                              │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                           │
                           ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│   GENERATE A GUI THAT IDENTIFIES AT LEAST A PORTION OF   │ ── 216
│   THE ANOMALIES IN THE SET OF ONE OR MORE FILES          │
└ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 3:
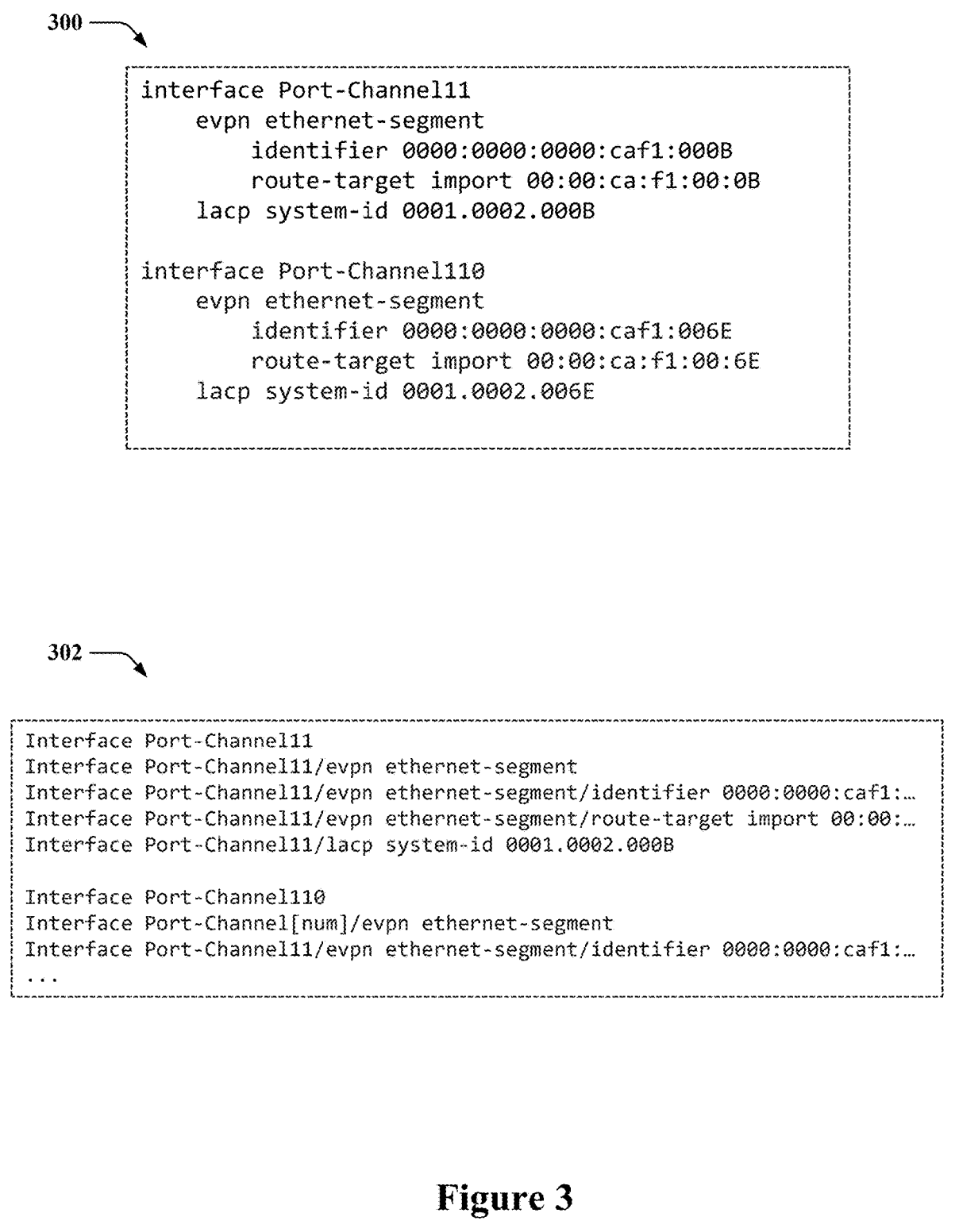

```
interface Port-Channel11
    evpn ethernet-segment
        identifier 0000:0000:0000:caf1:000B
        route-target import 00:00:ca:f1:00:0B
    lacp system-id 0001.0002.000B interface Port-Channel110
    evpn ethernet-segment
        identifier 0000:0000:0000:caf1:006E
        route-target import 00:00:ca:f1:00:6E
    lacp system-id 0001.0002.006E
```

302 —

```
Interface Port-Channel11
Interface Port-Channel11/evpn ethernet-segment
Interface Port-Channel11/evpn ethernet-segment/identifier 0000:0000:caf1:…
Interface Port-Channel11/evpn ethernet-segment/route-target import 00:00:…
Interface Port-Channel11/lacp system-id 0001.0002.000B Interface Port-Channel110
Interface Port-Channel[num]/evpn ethernet-segment
Interface Port-Channel11/evpn ethernet-segment/identifier 0000:0000:caf1:…
...
```

```
interface Port-Channel11
    evpn ethernet-segment
        identifier 0000:0000:0000:caf1:000B
        route-target import 00:00:ca:f1:00:0B
    lacp system-id 0001.0002.000B interface Port-Channel110
    evpn ethernet-segment
        identifier 0000:0000:0000:caf1:006E
        route-target import 00:00:ca:f1:00:6E
    lacp system-id 0001.0002.006E
```

402 ⟍

```
Interface Port-Channel[num]
Interface Port-Channel[num]/evpn ethernet-segment
Interface Port-Channel[num]/evpn ethernet-segment/identifier [hex]:[hex]:…
Interface Port-Channel[num]/evpn ethernet-segment/route-target import [mac]
Interface Port-Channel[num]/lacp system-id [hex].[hex].[hex]

Interface Port-Channel[num]
Interface Port-Channel[num]/evpn ethernet-segment
Interface Port-Channel[num]/evpn ethernet-segment/identifier [hex]:[hex]:…
...
```

```
Interface Port-Channel[num]
Interface Port-Channel[num]/evpn ethernet-segment/identifier [hex]:[hex]:[hex]:[hex]    [11]
                                                                                          [0x0, 0x0, 0x0, 0xcaf1, 0xb]

Interface Port-Channel[num]
Interface Port-Channel[num]/evpn ethernet-segment/identifier [hex]:[hex]:[hex]:[hex]    [110]
                                                                                          [0x0, 0x0, 0x0, 0xcaf1, 0x6e]
```

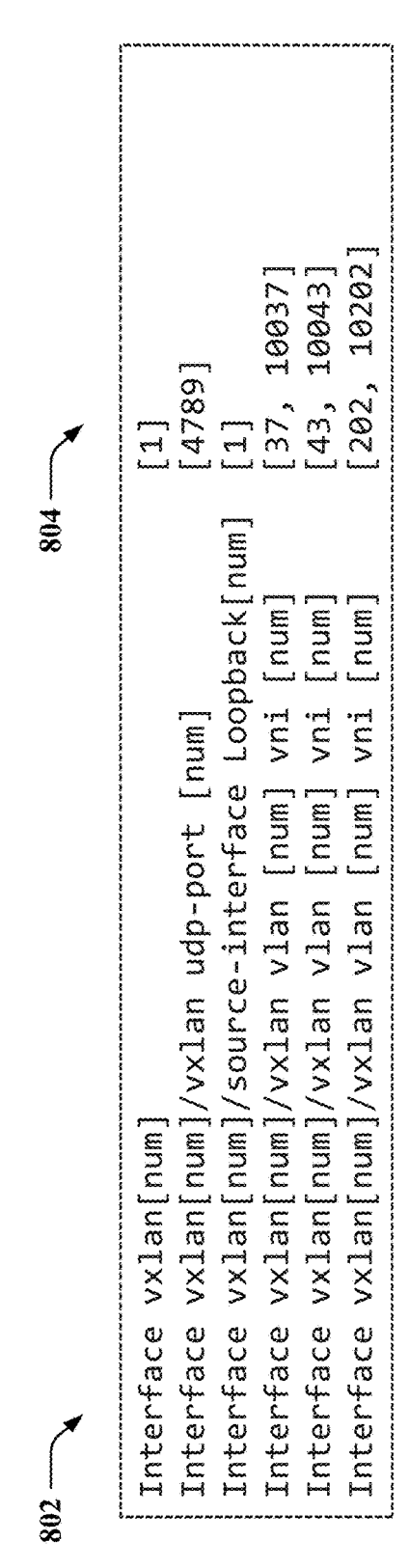

```
interface vxlan1
    vxlan udp-port 4789
    vxlan source-interface Loopback1
    vxlan vlan 37 vni 10037
    vxlan vlan 43 vni 10043
    vxlan vlan 202 vni 10202
```

800

```
Interface vxlan[num]
Interface vxlan[num]/vxlan udp-port [num]                        [4789]
Interface vxlan[num]/source-interface Loopback[num]             [1]
Interface vxlan[num]/vxlan vlan [num] vni [num]                 [37, 10037]
Interface vxlan[num]/vxlan vlan [num] vni [num]                 [43, 10043]
Interface vxlan[num]/vxlan vlan [num] vni [num]                 [202, 10202]
```

TECHNIQUES FOR DETECTING ANOMALIES IN DATA FILES

BACKGROUND

Configuration files are used to configure many large systems and/or services, such as network devices that are deployed to provide network services. For example, in cloud-based computing architectures, many network servers can be configured to provide processing, memory, database, etc. resources for executing services or processes for multiple clients. One challenge in running and operating large networks and systems is in maintaining the configurations and ensuring that the associated parameters, values, etc. are correctly specified in the configurations. When misconfigurations occur, this can lead to system failures and service outages that can impact millions of users.

Some tools have been developed that are highly targeted or specific to a particular type of configuration, such as structured query language (SQL), extensible operating system (EoS) configuration, etc. These tools are also built manually by engineers to analyze simple data formats and simple manually defined rules. As such, these tools must be kept up to date over time if the assumptions on the configurations change.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device for detecting anomalies in files is provided. The device includes one or more memories storing instructions, and one or more processors coupled to the one or more memories. The one or more processors are configured to execute the instructions to process each of multiple files to generate corresponding flat files, extract values from multiple lines of each of the flat files into a parameter vector in the one or more memories, store patterns from the multiple lines based on the values extracted in the one or more memories, provide, as input to a machine learning (ML) model, the parameter vector and the patterns to obtain, based on association rule learning, a set of rules for the files based on conditional probabilities, and apply the set of rules to a set of one or more files to detect anomalies in values in the set of one or more files.

In another example, a computer-implemented method for detecting anomalies in files is provided. The method includes obtaining multiple files corresponding to configuring network devices or network services, processing each of the multiple files to generate corresponding flat files, extracting values from multiple lines of each of the flat files into a parameter vector, generating patterns from the multiple lines based on the values extracted, obtaining, from a machine learning (ML) model based on providing the parameter vector and the patterns as input to the ML model, a set of rules for the files based on conditional probabilities, and applying the set of rules to a set of one or more files to detect anomalies in values in the set of one or more files.

In another example, a non-transitory computer-readable medium storing instructions thereon is provided where the instructions, when executed by at least one computing device, cause the at least one computing device to perform operations for detecting anomalies in files. The operations comprise extracting values from multiple lines of each of multiple files into a parameter vector, storing patterns from the multiple lines based on the values extracted, obtaining, from a machine learning (ML) model based on providing the parameter vector and the patterns as input to the ML model, a set of rules for the files based on conditional probabilities, and applying the set of rules to a set of one or more files to detect anomalies in values in the set of one or more files.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a flow diagram of an example of a method for obtaining a set of rules for configuration files, in accordance with aspects described herein.

FIG. 3 illustrates an example of an indentation-based structured file and a corresponding flat file, in accordance with aspects described herein.

FIG. 4 illustrates an example of the indentation-based structured file and patterns with values extracted, in accordance with aspects described herein.

FIG. 8 illustrates an example of an indentation-based structured file and corresponding patterns and feature vector values extracted therefrom for which a suffix relationship is detected, in accordance with aspects described herein.

DETAILED DESCRIPTION

Figure 1:
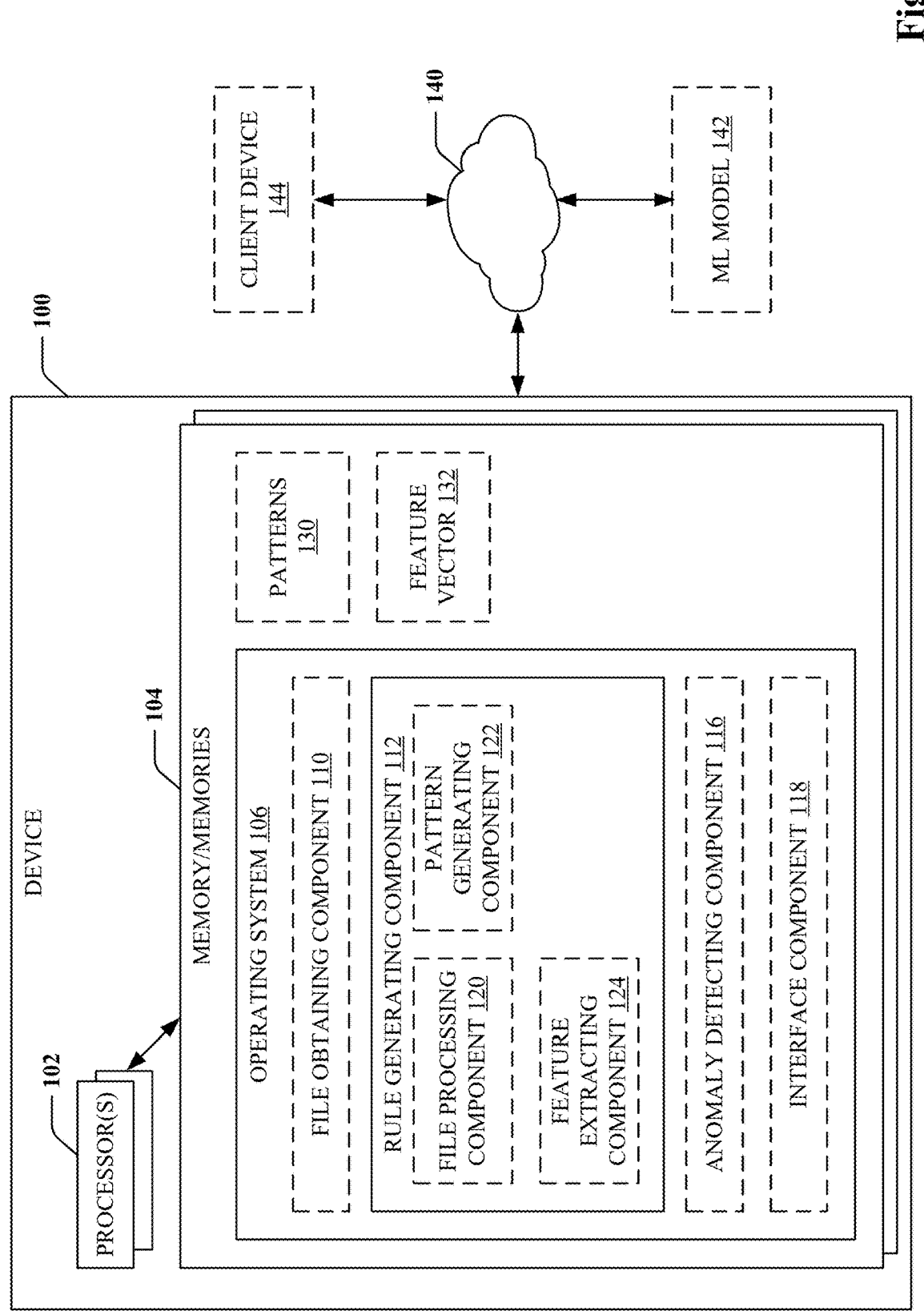
FIG. 1 is a schematic diagram of an example of a device for performing functions related to determining a set of rules for analyzing or validating files and/or detecting anomalies in files, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to detecting anomalies in data files, such as configuration files, metadata files, and/or the like. In particular, for example, machine learning (ML) can be used to learn what entails a correct configuration, and this understanding can be used to automatically check and validate future configuration changes. In this regard, for example, the validation can be based on machine learning over a set of configurations, and can apply to any configuration (or data file) regardless of the domain, as the ML model can be trained using configurations (or data files) from the domain. In addition, for example, the ML model can be automatically updated over time by re-training on newer configuration files (or other data files).

Specifically, in examples described herein, given a set of example configuration files for training the ML model, common data values can be automatically extracted from the configuration files, and the ML model can attempt to learn multi-parameter relationships between parameters and/or corresponding values in the configurations, which may be based on a statistical significance of the detected relationship within the configuration files. In some examples, the ML model can be used to perform association rule learning that can identify logical rules of the form "forall values in lines with pattern1, there exists a value in a line with pattern2, and these values are related in some way." Such rules can be effective in the context of configuration files. The resulting output using the ML model can include a set of "rules" that can then be applied to another configuration to detect anomalies. In an example, to validate new or changed configurations, service operators can automatically run the learned rules against a subsequent configuration file to obtain a set of potential misconfigurations, and/or suggestions for correcting the misconfigurations (e.g., an expected value based on the applied rule). In an example, violations can then be used for further triaging.

Providing a ML-based configuration file (or data file) validation or anomaly detection process, in this regard, can operate on substantially any type of file in substantially any domain, as a set of files in the domain can be used to train the ML model, and then rules generated by the ML model can be used to detect anomalies in other files in the domain.

Turning now to FIGS. 1-9, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a schematic diagram of an example of a device 100 (e.g., a computing device) for performing functions related to determining a set of rules for analyzing or validating files and/or detecting anomalies in files, in accordance with aspects described herein. In an example, device 100 can include one or more processors 102 and/or memory/memories 104 configured to execute or store instructions or other parameters related to providing an operating system 106, which can execute one or more applications or processes. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/execution by processor(s) 102 to perform functions described herein. In another example, processor(s) 102 and/or memory/memories 104 can be distributed over multiple devices or physical computing nodes in a network (e.g., in a cloud-based computing platform) for providing the functions of the various components described herein.

In one example, the operating system 106 can execute one or more applications or processes, which may optionally include, but are not limited to, a file obtaining component 110 for obtaining one or more files for generating a set of rules for analyzing or validating subsequent files, a rule generating component 112 for generating a set of rules based on the obtained files for analyzing or validating subsequent files, an anomaly detecting component 116 for detecting anomalies in subsequent files based on the set of rules, and/or an interface generating component 118 for generating one or more interfaces including output or other indications of detected anomalies, corresponding portions of the subsequent file, a suggested correction to cure the anomaly (e.g., an expected value for an attribute or parameter), etc. In an example, rule generating component 112 may optionally include a file processing component 120 for performing processing of the one or more files obtained by file obtaining component 110 to simplify rule detection, a pattern generating component 122 for assigning patterns based on values extracted in the one or more files and/or storing in patterns 130 in memory/memories 104, and/or a feature extracting component 124 for extracting one or more values (e.g., features of attribute or parameters or values) in the one or more files, and/or storing in feature vector 132 in memory/memories 104.

In an example, device 100 can communicate with one or more other nodes or devices over a network 140, which can include one or more network connections, the Internet, etc. For example, device 100 can communicate with a ML model 142 for performing relationship learning on the one or more files to detect the set of rules, and/or a client device 144 for providing the one or more files to use in detecting the set of rules, providing one or more subsequent files for anomaly detection, using an interface to view or correct detected anomalies, etc. For example, ML model 142 may be trained on certain data, such as the one or more files, patterns or feature vectors extracted from the one or more files, a set of relationships or rule templates that can be used to detect conditional probabilities for defining the set of rules, etc. The ML model 142, in an example, can receive input data, and can provide output data based on the training data or inferences based on the training data, etc.

FIG. 2 is a flowchart of an example of a method 200 for obtaining a set of rules for configuration files, in accordance with aspects described herein. For example, method 200 can be performed by a device 100 and/or one or more components thereof to facilitate obtaining the set of rules based on multiple input files, as described herein.

In method 200, at action 202, multiple files can be obtained. In an example, file obtaining component 110, e.g., in conjunction with processor(s) 102, memory/memories 104, operating system 106, etc., can obtain the multiple files. For example, file obtaining component 110 can obtain the multiple files from a client device 144, which may access an interface provided by interface generating component 118 to upload the multiple files, specify a location (e.g., universal resource locator (URL)) of the multiple files, etc. For example, the multiple files may include configuration files used to configure one or more network devices, one or more network services, etc. In other examples, the one or more files can include metadata files or other types of data files that may have a list of attributes, parameters, corresponding values, etc. In an example, the files may be of substantially any format. In on example, the files may have a hierarchical structure, such as JavaScript Object Notation (JSON), extensible Markup Language (XML), Yet Another Markup Language (YAML), an indentation-based structure, etc.

In method 200, optionally at action 204, each of the multiple files can be processed to generate corresponding flat files. In an example, file processing component 120, e.g., in conjunction with processor(s) 102, memory/memories 104, operating system 106, rule generating component 112, etc., can process each of the multiple files to generate corresponding flat files. For example, file processing component 120 can execute one or more processes to generate the corresponding flat files, where the one or more processes can convert the files into flat line-by-line format, which may simplify learning processes while maintaining structural context. For example, the one or more processes may be dependent on a type of the files and/or may include a JSON processor to process JSON files into flat files, an indentation processor to process indentation-based structured files into flat files, etc. For example, the one or more processes may list each attribute while retaining any parent or root attributes thereof. An example is depicted in FIG. 3.

FIG. 3 illustrates an example of an indentation-based structured file 300 and a corresponding flat file 302, in accordance with aspects described herein. Each line of the indentation-based structured file 300 can have an indentation (or a root level of no indentation) to indicate the hierarchical structure. The corresponding flat file 302 produced by file processing component 120 can have a separate (non-indented) line for each line of the indentation-based structured file 300 with the structure retained by indicating, within each line, each parent attribute (or line) for the line based on the indentation structure. For example, the second line, "evpn ethernet-segment" that is indented, has a parent line "interface Port-Channel11." In an example, file processing component 120 can preserve the structure in the corresponding second line of the flat file 302 by indicating the value as "parent line/line," or in this example, "interface Port-Channel11/evpn ethernet-segment."

In another example, the files may already have a substantially flat structure, and/or file processing component 120 may not perform a file flattening process. When flat files are generated, or otherwise using the originally received files, feature extracting component 124 can extract features from the files, as described herein.

In method 200, at action 206, values can be extracted from multiple lines of each of the flat files into a parameter vector, and at action 208, patterns can be generated from the multiple lines based on the values extracted. In an example, feature extracting component 124, e.g., in conjunction with processor(s) 102, memory/memories 104, operating system 106, rule generating component 112, etc., can extract the values from multiple lines of each of the flat files into the feature vector 132. For example, feature extracting component 124 can extract common values from each line, such as number values, hexadecimal values, network addresses (e.g., media access control (MAC) addresses, internet protocol (IP) addresses, etc.) or associated prefixes, flags, etc., which can be based on detecting a format of the values (e.g., detect a number, detecting a string with a network address format, etc.).

In an example, pattern generating component 122, e.g., in conjunction with processor(s) 102, memory/memories 104, operating system 106, rule generating component 112, etc., can generate the patterns 130 from the multiple lines based on the values extracted. In an example, feature extracting component 124 can be configured with one or more built-in value patterns for detecting, such as [bool], [num], [hex], [mac], [ip4], [prefix4], [ip6], [prefix6], etc. and/or can include logic for detecting the values in the lines of the flat file. When feature extracting component 124 encounters one of the values in the line, it can add the value to a feature vector 132 for the line, and/or pattern generating component 122 can replace the value with a value type indicator, such as [bool], [num], [hex], [mac], [ip4], [prefix4], [ip6], [prefix6], etc. An example is shown in FIG. 4.

FIG. 4 illustrates an example of the indentation-based structured file 300 and patterns 402 with values extracted, in accordance with aspects described herein. As described, for example, file processing component 120 can first process the indentation-based structured file 300 to a flat file (e.g., flat file 302). In addition, for example, feature extracting component 124 can extract common values from one or more lines of the flat file, e.g., based on detecting the value type as present in the line, such as detecting the various hexadecimal values "0000," "0000," "0000," "caf1," and "000B." In an example, feature extracting component 124 can extract these values to a feature vector 132 for the line. In addition, for example, pattern generating component 122 can replace the values with a value type indicator (e.g., value type labels or tags), such as "[hex]," and store the line as a pattern in patterns 402. In another example, in the fourth line, feature extracting component 124 can detect and extract the MAC address "00:00:ca:f1:00:0b" and replace the value with value type "[mac]" for storing as a pattern in the patterns 402. In addition, in an example, feature extracting component 124 can be extended to parse substantially any kind of regular expression in certain files in a certain domain, etc., to capture certain values in a certain way and/or pattern generating component 122 can be configured to replace the values with more generic tags in storing an associated pattern.

Figure 5:
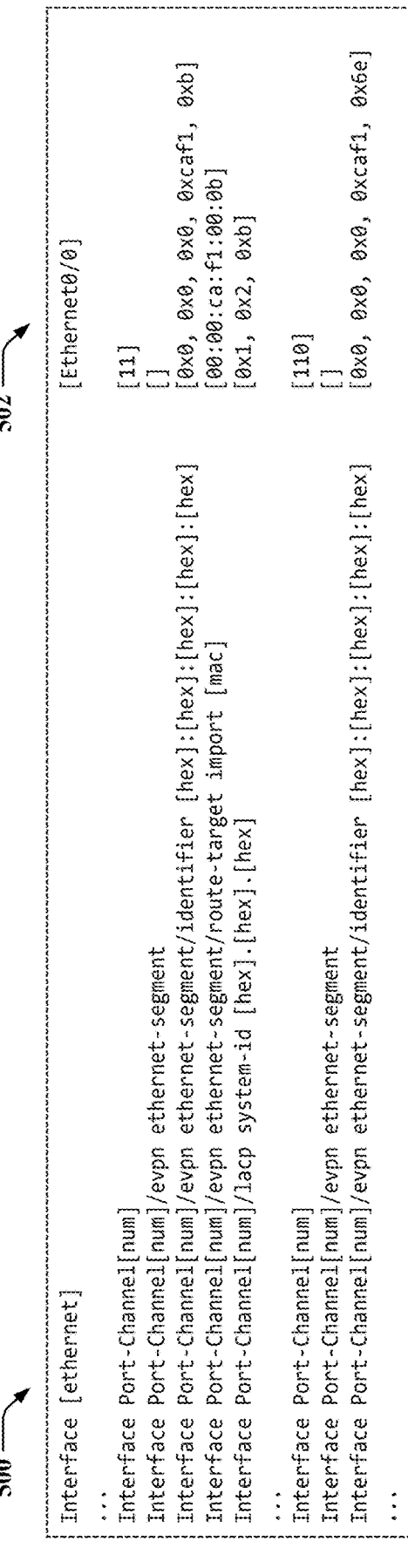
FIG. 5 illustrates an example of the patterns for the indentation-based structured file and feature vector extracted therefrom, in accordance with aspects described herein.

FIG. 5 illustrates an example of the patterns 500 for the indentation-based structured file 300 and feature vector 502 extracted therefrom, in accordance with aspects described herein. The patterns 500 can include lines with the values extracted and replaced with value tags, as shown. In an example, feature extracting component 124 can extract the values into the corresponding feature vector 502 (e.g., feature vector 132). The patterns 500 and corresponding feature vector 502 can be used in subsequent processing, as described herein. In particular, for example, using the patterns 500 and feature vector 502 (e.g., instead of the file as obtained) can simplify the learning process based on ML model 142, which can improve performance and/or detectability of valid configurations or anomalies.

In method 200, at action 210, a set of rules for the files based on conditional probabilities, can be obtained, from a ML model based on providing the parameter vector and patterns as input to the ML model. In an example, rule generating component 112, e.g., in conjunction with processor(s) 102, memory/memories 104, operating system 106, etc., can obtain, from an ML model (e.g., ML model 142) based on providing the parameter vector and patterns as input to the ML model, the set of rules for the files based on conditional probabilities. For example, the ML model 142 can performing association rule learning, which can be or include a statistical learning method that learns usage rules from the input data based on condition probabilities. For example, ML model 142 can detect certain relationships or rule templates among values or patterns with a certain statistical significance, and can report these rules as output. For example, the ML model may learn a rule such as "for every line matching pattern p1, there is a line matching pattern p2 with related values." Examples are shown in FIGS. 6-8.

Figure 6:
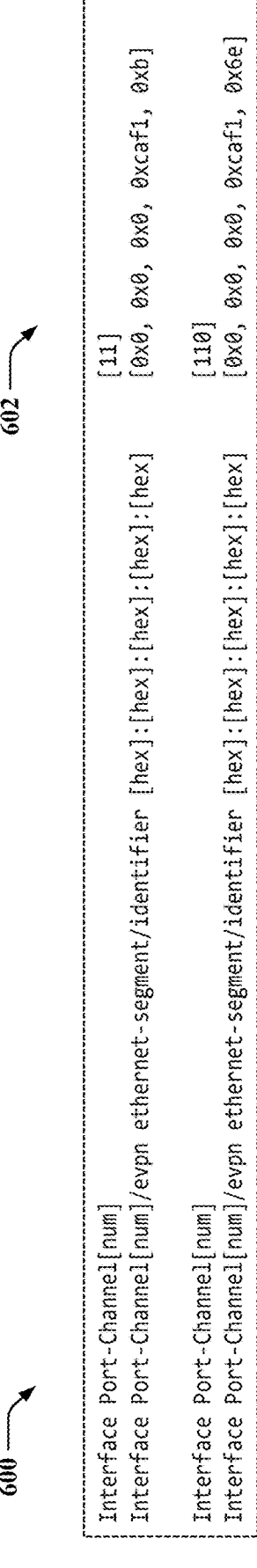
FIG. 6 illustrates an example of patterns and feature vector values for which a rule is detected, in accordance with aspects described herein.

FIG. 6 illustrates an example of patterns 600 and feature vector values 602 for which a rule is detected, in accordance with aspects described herein. For example, the ML model 142 may detect, based on the input patterns 130 or 500 and feature vectors 132 or 502, the rule "for every line with pattern p1 and value v1, there is a line with pattern p2 and value v2 where: R(v1, v2) and R is the relationship 'to_base_10.'" In this example, the ML model 142 may detect that for lines of pattern p1, "Interface Port-Channel [num]," in patterns 600, the value of [num] in the feature vector values 602 can have the relationship "to_base_10" with the value v2 in pattern p2 "Interface Port-Channel [num]/evpn ethernet-segment/identifier [hex]: [hex]: [hex]: [hex]: [hex]," the value v2 being the last [hex] value in the pattern p2. In other words, in this example, values v1 and v2 can have a to_base_10 relationship. In this example, the ML model 142 can detect that this rule holds with a statistical significance over multiple lines in the files, and can accordingly output the rule.

Figure 7:
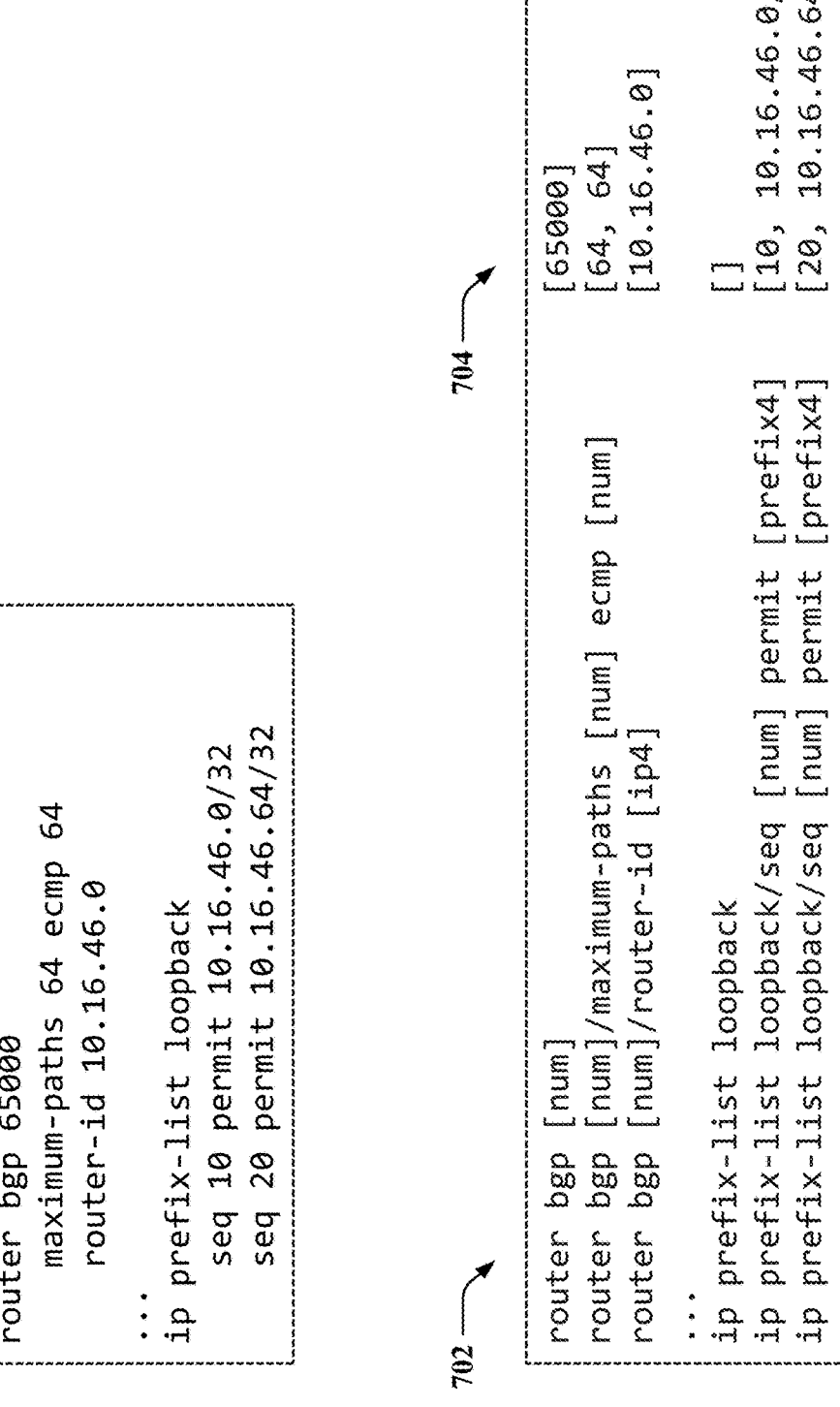
FIG. 7 illustrates an example of an indentation-based structured file and corresponding patterns and feature vector values extracted therefrom for which a subnet relationship is detected, in accordance with aspects described herein.

FIG. 7 illustrates an example of an indentation-based structured file 700 and corresponding patterns 702 and feature vector values 704 extracted therefrom for which a subnet relationship is detected, in accordance with aspects described herein. In this example, the ML model 142 may detect, based on the input patterns 130 or 702 and feature vectors 132 or 704, the rule "if there is a line defining the router-id as an ipv4 address, then there is a loopback permit ACL line with a prefix that allows that IP address," or may detect the rule as a corresponding "subnet_containment" relationship. In this example, the ML model 142 may detect that for lines of pattern p1, "router bgp [num]/router-id [ip4]," in patterns 702, the value of [ip4] in the feature vector values 704 can have the relationship "subnet_containment" (e.g., is within the subnet of) the value v2 in pattern p2 "ip prefix-list loopback/seq [num] permit [prefix4]," the value v2 being the [prefix] value in the pattern p2. In other words, in this example, values v1 and v2 can have a to_base_10 relationship. In this example, the ML model 142 can detect that this rule holds with a statistical significance over multiple lines in the files, and can accordingly output the rule.

FIG. 8 illustrates an example of an indentation-based structured file 800 and corresponding patterns 802 and feature vector values 804 extracted therefrom for which a suffix relationship is detected, in accordance with aspects described herein. In this example, the ML model 142 may detect, based on the input patterns 130 or 802 and feature vectors 132 or 804, the rule "the VXLAN network identifier (VNI) is a suffix of the VLAN ID (add 10000)," or may detect the rule as a corresponding "suffix_of" relationship. In this example, the ML model 142 may detect that for lines of pattern p1, "Interface vxlan [num]/vxlan vlan [num] vni [num]," in patterns 802, the value of the last two [num] in the feature vector values 804 for the pattern p1 can have the relationship "suffix_of" where one value is a suffix of another (e.g., one value is the same as some least significant digits of another value). In this example, the ML model 142 can detect that this rule holds with a statistical significance over multiple lines in the files, and can accordingly output the rule.

In an example, rule generating component 112 may also provide the relationships, rule templates, or associated information as input to the ML model 142 as well to facilitate detecting the certain types of relationships among values (e.g., to_base_10, subnet_containment, suffix_of, etc.). In method 200, optionally at action 212, one or more relationships or rule templates for detecting conditional probabilities can be provided as input to the ML model. In an example, rule generating component 112, e.g., in conjunction with processor(s) 102, memory/memories 104, operating system 106, etc., can provide, as input to the ML model 142, the one or more relationships or rule templates for detecting conditional probabilities.

For example, the relationships may include: an equality relationship where two values can be equal modulo some transformations (e.g., hex and number), which can be represented as a hashmap from the value to a list of pairs of the (pattern, feature vector index); a subnet relationship where an IP address is contained within a prefix of the same type (e.g., V4, V6), which can be represented as a prefix trie data structure for fast lookups; a prefix_of relationship where a value is always a prefix of another, which can be represented as a string trie data structure for fast lookups; or a suffix_of relationship where a value is always a suffix of another, which can be represented as a string trie data structure for fast lookups.

For example, the rule templates may include: a present template type where pattern p is present, which can detect missing lines from a file; a before template type where pattern p1 is before p2, which can detect ordering errors or missing lines; an after template type where pattern p1 is after p2, which can detect ordering errors or missing lines; a correlation template type where pattern p1 appears and then pattern p2 appears with related values, which can detect missing dependencies or mismatched value, an anomaly template type where pattern p has no abnormal values (which may be based on an isolation forest anomaly detection algorithm), which can detect value errors or typos; a unique template type where pattern p has globally unique values, which can detect copy past errors or accidental resource reuse; a consecutive template type where pattern p has consecutive values, which can detect missing sequential configuration elements; or a type template where pattern p1 used instead of p2 with wrong type, which can detect mistyped configuration attributes (e.g., using a number where an IP address is expected).

ML model 142 can use the one or more relationships or rule templates to detect the rules in the files, as described above. For example, ML model 142 can detect whether the relationships or rule templates exist in the files with a statistical significance or otherwise based on conditional probabilities such to generate a set of rules for the patterns and feature vectors provided as input to the ML model 142. In one example ML model 142 can perform association rule learning based on computing statistical metrics to determine the amount of evidence for possible rules, based on determining the number of configurations that have an example of the rule, based on determining the percentage of the time the rule holds, based on the conditional probability of the rule given its components, etc. For correlation rules, ML model 142 can use dynamic scoring based on the observed values. For example, common values such as 0, 1, 2, 3 may provide less evidence of a rule than rare values like 3394. In addition, for example, more specific prefixes (e.g., /31) may provide more evidence than broad ones (e.g., /0). Rules with rare values may require fewer examples to be learned.

In method 200, optionally at action 214, the set of rules can be applied to a set of one or more files to detect anomalies in values in the set of one or more files. In an example, anomaly detecting component 116, e.g., in conjunction with processor(s) 102, memory/memories 104, operating system 106, etc., can apply the set of rules to the set of one or more files to detect anomalies in values in the set of one or more files. In an example, the set of one or more files can include one or more other files that were not used by the ML model 142 to detect the set of rules. In another example, the set of one or more files may include the files used by the ML model 142 to detect the rules, and variations from, or anomalies of, the set of rules can be detected in the files. For example, anomaly detecting component 116 can detect patterns in the set of one or more files and can determine whether the patterns comply with the set of rules output by ML model 142 (e.g., whether detected relationships exist among values, whether relationships detected between patterns exist, etc.). Where anomalies are detected, for example, anomaly detecting component 116 may perform various actions, such as output an indication of the anomaly, an indication of a file and/or line of the file where the anomaly is detected, output an expected value to correct the anomaly, provide a link to the file (e.g., to a URL of the file), etc.

In method 200, optionally at action 216, a graphical (GUI) that identifies at least a portion of the anomalies in the set of one or more files can be generated. In an example, interface generating component 118, e.g., in conjunction with processor(s) 102, memory/memories 104, operating system 106, etc., can generate the GUI that identifies at least the portion of the anomalies in the set of one or more files. For example, interface generating component 118 can generate and/or display the GUI via operating system 106 on a display of the device 100, and/or can facilitate interaction with the GUI to display anomalies, display the corresponding file or portion of the file where the anomaly is detected, display a recommendation to correct the anomaly (e.g., an expected value), and/or the like.

Figure 9:
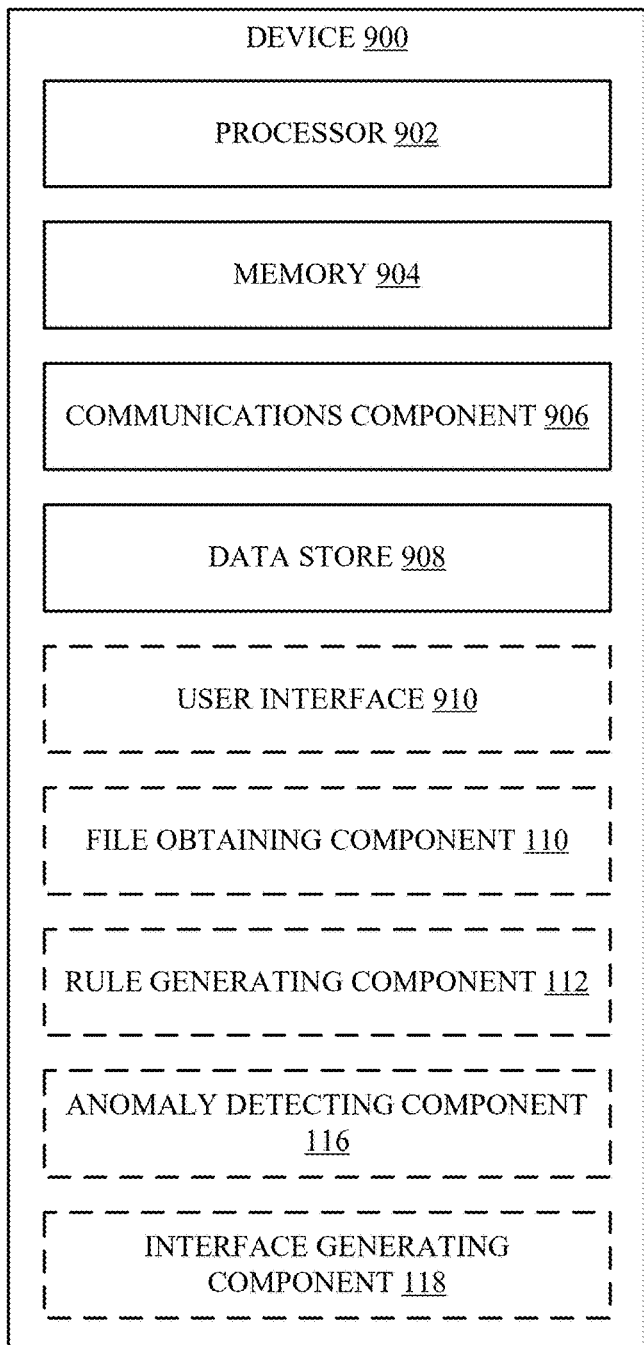
FIG. 9 is a schematic diagram of an example of a device for performing functions described herein, in accordance with aspects described herein.

FIG. 9 illustrates an example of device 900 including additional optional component details as those shown in FIG. 1. In one aspect, device 900 may include processor 902, which may be similar to processor(s) 102 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory/memories 104 such as for storing local versions of operating systems (or components thereof) and/ or applications being executed by processor 902, such as a file obtaining component 110, rule generating component 112, anomaly detecting component 116, interface generating component 118, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc.) not currently being executed by processor 902. In addition, data store 908 may be a data repository for file obtaining component 110, rule generating component 112, anomaly detecting component 116, interface generating component 118, and/or one or more other components of the device 900.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof. For example, user interface component 910 can provide output for GUIs generated by interface generating component 118 and/or can receive input for interacting with the GUIs, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for detecting anomalies in files, comprising:
   one or more memories storing instructions; and
   one or more processors coupled to the one or more memories and configured to execute the instructions to:
      process each of multiple files to generate corresponding flat files;
      extract values from multiple lines of each of the corresponding flat files into a parameter vector in the one or more memories;
      store patterns from the multiple lines based on the values extracted in the one or more memories including replacing the extracted values with type identifiers of a data type of the extracted values;
      provide, as input to a machine learning (ML) model, the parameter vector and the patterns to obtain, based on association rule learning, a set of rules for the files based on conditional probabilities; and
      apply the set of rules to a set of one or more files to detect anomalies in values in the set of one or more files.

2. The device of claim 1, wherein the one or more processors are configured to execute the instructions to generate a graphical user interface (GUI) that identifies at least a portion of the anomalies in the set of one or more files.

3. The device of claim 2, wherein the GUI identifies, for a given one of the anomalies, a correction to one or more of the values to correct the given one of the anomalies.

4. The device of claim 1, wherein the multiple files have a hierarchical structure, and wherein the one or more processors are configured to execute the instructions to process each of the multiple files to generate the corresponding flat files at least in part by generating, for each attribute of the multiple files, a corresponding line in the corresponding flat files that includes the attribute and any parent attributes.

5. The device of claim 1, wherein the one or more processors are configured to execute the instructions to extract the values at least in part by extracting one or more of number values, network addresses, prefixes, or flags from the multiple lines of each of the corresponding flat files into the parameter vector.

6. The device of claim 1, wherein the one or more processors are configured to execute the instructions to generate a graphical user interface (GUI) that identifies at least a portion of the set of rules obtained from the ML model.

7. The device of claim 6, wherein the GUI identifies a percentage of time that each of the portion of the set of rules holds true in the multiple files.

8. The device of claim 1, wherein the one or more processors are configured to execute the instructions to provide, as input to the ML model, one or more relationships or rule templates for detecting the conditional probabilities in the values of the parameter vector or the patterns for defining the set of rules.

9. A computer-implemented method for detecting anomalies in files, comprising:

obtaining multiple files corresponding to configuring network devices or network services;

processing each of the multiple files to generate corresponding flat files;

extracting values from multiple lines of each of the corresponding flat files into a parameter vector;

generating patterns from the multiple lines based on the values extracted including replacing the extracted values with type identifiers of a data type of the extracted values;

obtaining, from a machine learning (ML) model based on providing the parameter vector and the patterns as input to the ML model, a set of rules for the files based on conditional probabilities; and applying the set of rules to a set of one or more files to detect anomalies in values in the set of one or more files.

10. The computer-implemented method of claim 9, further comprising generating a graphical user interface (GUI) that identifies at least a portion of the anomalies in the set of one or more files.

11. The computer-implemented method of claim 10, wherein the GUI identifies, for a given one of the anomalies, a correction to one or more of the values to correct the given one of the anomalies.

12. The computer-implemented method of claim 9, wherein the multiple files have a hierarchical structure, and wherein processing each of the multiple files to generate the corresponding flat files includes generating, for each attribute of the multiple files, a corresponding line in the corresponding flat files that includes the attribute and any parent attributes.

13. The computer-implemented method of claim 9, wherein extracting the values includes extracting one or more of number values, network addresses, prefixes, or flags from the multiple lines of each of the corresponding flat files into the parameter vector.

14. The computer-implemented method of claim 9, further comprising generating a graphical user interface (GUI) that identifies at least a portion of the set of rules obtained from the ML model.

15. The computer-implemented method of claim 14, wherein the GUI identifies a percentage of time that each of the portion of the set of rules holds true in the multiple files.

16. The computer-implemented method of claim 9, further comprising providing, as input to the ML model, one or more relationships or rule templates for detecting the conditional probabilities in the values of the parameter vector or the patterns for defining the set of rules.

17. A non-transitory computer-readable medium storing instructions thereon that, when executed by at least one computing device, cause the at least one computing device to perform operations for detecting anomalies in files, comprising:

extracting values from multiple lines of each of multiple files into a parameter vector;

storing patterns from the multiple lines based on the values extracted including replacing the extracted values with type identifiers of a data type of the extracted values;

obtaining, from a machine learning (ML) model based on providing the parameter vector and the patterns as input to the ML model, a set of rules for the files based on conditional probabilities; and applying the set of rules to a set of one or more files to detect anomalies in values in the set of one or more files.

18. The non-transitory computer-readable medium of claim 17, the operations further comprising generating a graphical user interface (GUI) that identifies at least a portion of the anomalies in the set of one or more files.

* * * * *